United States Patent
Li et al.

(10) Patent No.: US 12,079,383 B2
(45) Date of Patent: Sep. 3, 2024

(54) HEADSET WIRE TRACKING AND NOTIFICATION

(71) Applicant: Lenovo (Singapore) Pte. Ltd., Singapore (SG)

(72) Inventors: Scott Li, Cary, NC (US); Robert J. Kapinos, Durham, NC (US); Russell Speight VanBlon, Raleigh, NC (US); Robert James Norton, Jr., Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/820,046

(22) Filed: Aug. 16, 2022

(65) Prior Publication Data
US 2024/0061498 A1    Feb. 22, 2024

(51) Int. Cl.
G06F 3/01 (2006.01)
G06T 15/20 (2011.01)
H04N 13/111 (2018.01)
H04N 13/344 (2018.01)

(52) U.S. Cl.
CPC .......... G06F 3/012 (2013.01); G06T 15/20 (2013.01); *G06T 2210/62* (2013.01); *H04N 13/111* (2018.05); *H04N 13/344* (2018.05)

(58) Field of Classification Search
CPC ..... G06F 3/012; G06T 15/20; G06T 2210/62; H04N 13/344; H04N 13/111
See application file for complete search history.

(56) References Cited

U.S. PATENT DOCUMENTS

| | | | |
|---|---|---|---|
| 6,842,524 B1 * | 1/2005 | Kobayashi | H04S 1/002 381/1 |
| 10,653,116 B2 * | 5/2020 | Dugan | A01K 27/003 |
| 11,181,974 B2 * | 11/2021 | Nienstedt | G06F 1/1686 |
| 2015/0094142 A1 * | 4/2015 | Stafford | A63F 13/212 463/31 |
| 2015/0211931 A1 * | 7/2015 | Wang | E02F 9/261 250/338.3 |
| 2017/0021944 A1 * | 1/2017 | Peverill | B60L 53/68 |
| 2017/0203213 A1 * | 7/2017 | Stafford | A63F 13/25 |
| 2018/0095529 A1 * | 4/2018 | Tokubo | A63F 13/25 |
| 2018/0249274 A1 * | 8/2018 | Lyren | H04S 7/303 |
| 2018/0260022 A1 * | 9/2018 | Pan | G06T 3/60 |
| 2021/0097285 A1 * | 4/2021 | Lee | G06F 3/011 |
| 2022/0365588 A1 * | 11/2022 | Nakashima | G06T 11/60 |
| 2023/0051265 A1 * | 2/2023 | Lev | G06K 7/1417 |
| 2023/0061649 A1 * | 3/2023 | Armstrong | A63F 13/26 |

FOREIGN PATENT DOCUMENTS

| | | | | |
|---|---|---|---|---|
| CN | 107275976 A | * | 10/2017 | .......... B25J 9/1684 |
| WO | WO-2014108675 A1 | * | 7/2014 | ......... G02B 27/0093 |

* cited by examiner

*Primary Examiner* — Yu Chen
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to track a location of at least a segment of a wire of a virtual reality (VR) headset. The instructions are also executable to, based on the location and responsive to a trigger, present a notification regarding the location on a display of the VR headset.

20 Claims, 7 Drawing Sheets

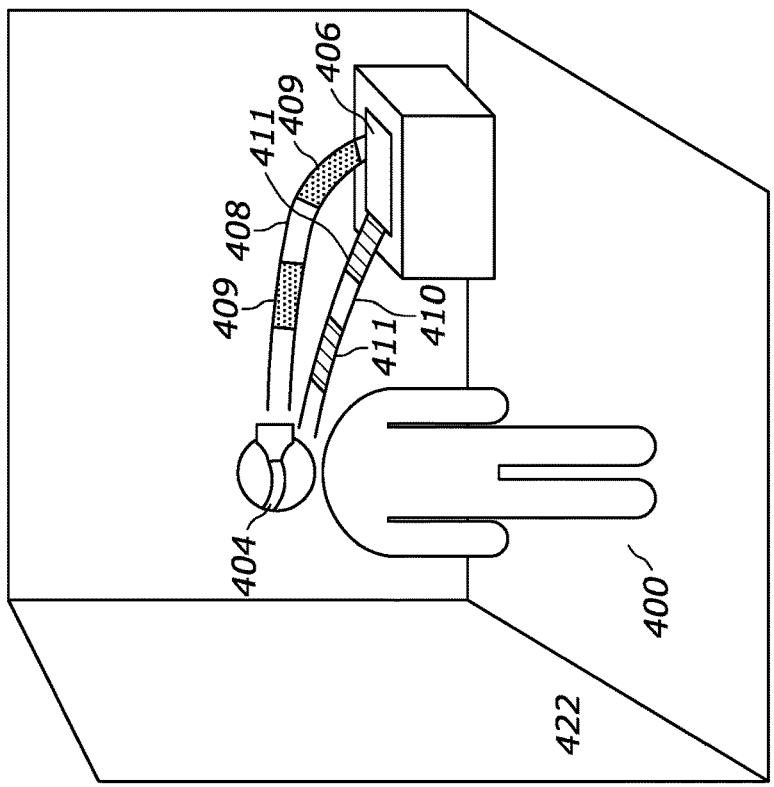
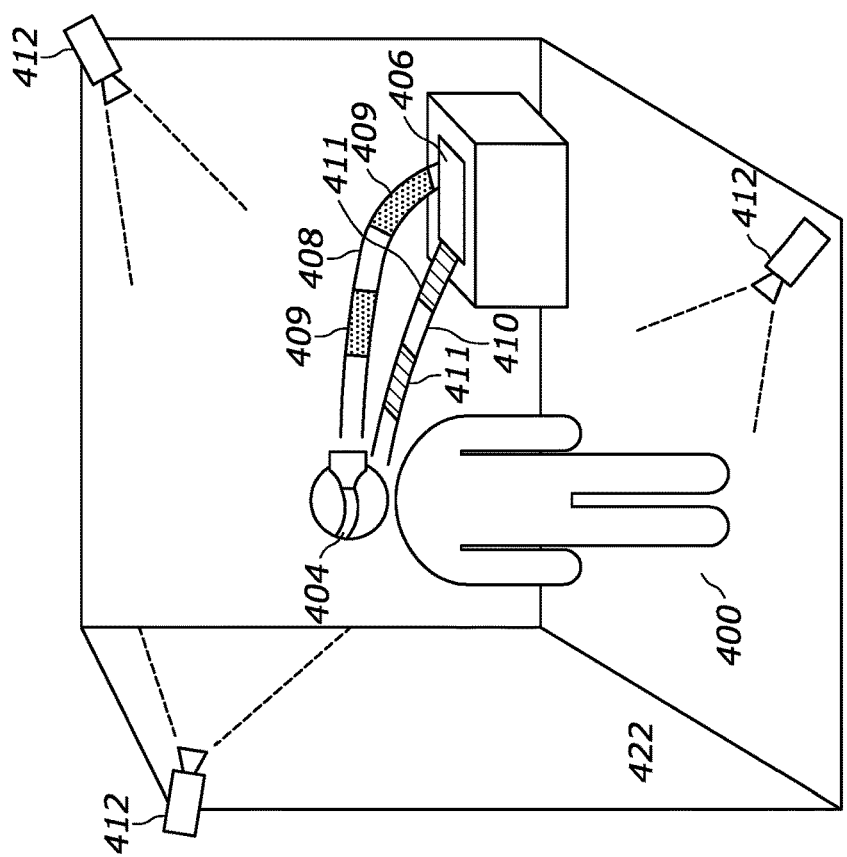
FIG. 4B
FIG. 4A

HEADSET WIRE TRACKING AND NOTIFICATION

FIELD

The disclosure below relates to technically inventive, non-routine solutions that are necessarily rooted in computer technology and that produce concrete technical improvements. In particular, the disclosure below relates to headset wire tracking.

BACKGROUND

As recognized herein, wires are often used to connect a virtual reality (VR) headset to a processing device that generates the VR simulation itself. However, as also recognized herein, this can present safety issues like tripping hazards for people when moving about, sometimes with exaggerated motion, to engage with the VR simulation. As also recognized herein, wireless VR headsets are often suboptimal as the wireless systems can exhibit processing delays owing to the added burden of wireless transmission. Wireless systems can also consume undue amounts of power in sending and receiving the wireless transmissions themselves. Therefore, there are currently no adequate solutions to the foregoing computer-related, technological problems.

SUMMARY

Accordingly, in one aspect a device includes at least one processor and storage accessible to the at least one processor. The storage includes instructions executable by the at least one processor to track a location of at least a segment of a wire of a virtual reality (VR) headset. The instructions are also executable to, based on the location and responsive to a trigger, present a notification regarding the location on a display of the VR headset.

Thus, in various example embodiments the instructions may be executable to track the location by tracking an infrared (IR) light reflector on the segment. For example, the instructions may be executable to track a patterned IR light reflector to track the location. Also in certain example embodiments, the device may include the headset and the wire, and in these embodiments the IR light reflector may be painted on the wire, established by a wire sleeve on the segment, and/or established by a layer glued onto the wire.

Still further, in some example implementations the instructions may be executable to use input from at least one camera to track the location. The device may even include the camera.

In various examples, the instructions may be executable to present the notification on the display concurrently with presenting VR content on the display.

Also in various examples, the instructions may be executable to identify the trigger. The trigger may include the wire contacting a portion of a user other than the user's head, the wire wrapping at least partially around a portion of the user, and/or the wire being less than a threshold distance away from a lower extremity of the user.

Still further, in various example implementations the notification may include a representation of an at least partial outline of the wire relative to the user of the VR headset.

In another aspect, a method includes tracking a location of at least a segment of a wire of a headset and, based on the location, presenting a notification regarding the location on a display of the headset.

Thus, in certain examples the method may include presenting the notification regarding the location on the display of the headset based on the location and responsive to a trigger.

Also in various examples, the notification itself may include a semi-transparent rendering on the display of at least the segment.

In still another aspect, at least one computer readable storage medium (CRSM) that is not a transitory signal includes instructions executable by at least one processor to track a location of at least a segment of a wire of a headset and, based on the location, present an electronic notification regarding the location.

In certain example implementations, the instructions may be executable to present the electronic notification regarding the location based on the location and responsive to a trigger.

Also in various examples, the electronic notification may include an audible notification.

The details of present principles, both as to their structure and operation, can best be understood in reference to the accompanying drawings, in which like reference numerals refer to like parts, and in which:

BRIEF DESCRIPTION OF THE DRAWINGS

FIGS. 4A and 4B show perspective views of a user engaging in a VR simulation consistent with present principles;

DETAILED DESCRIPTION

Figure 1:
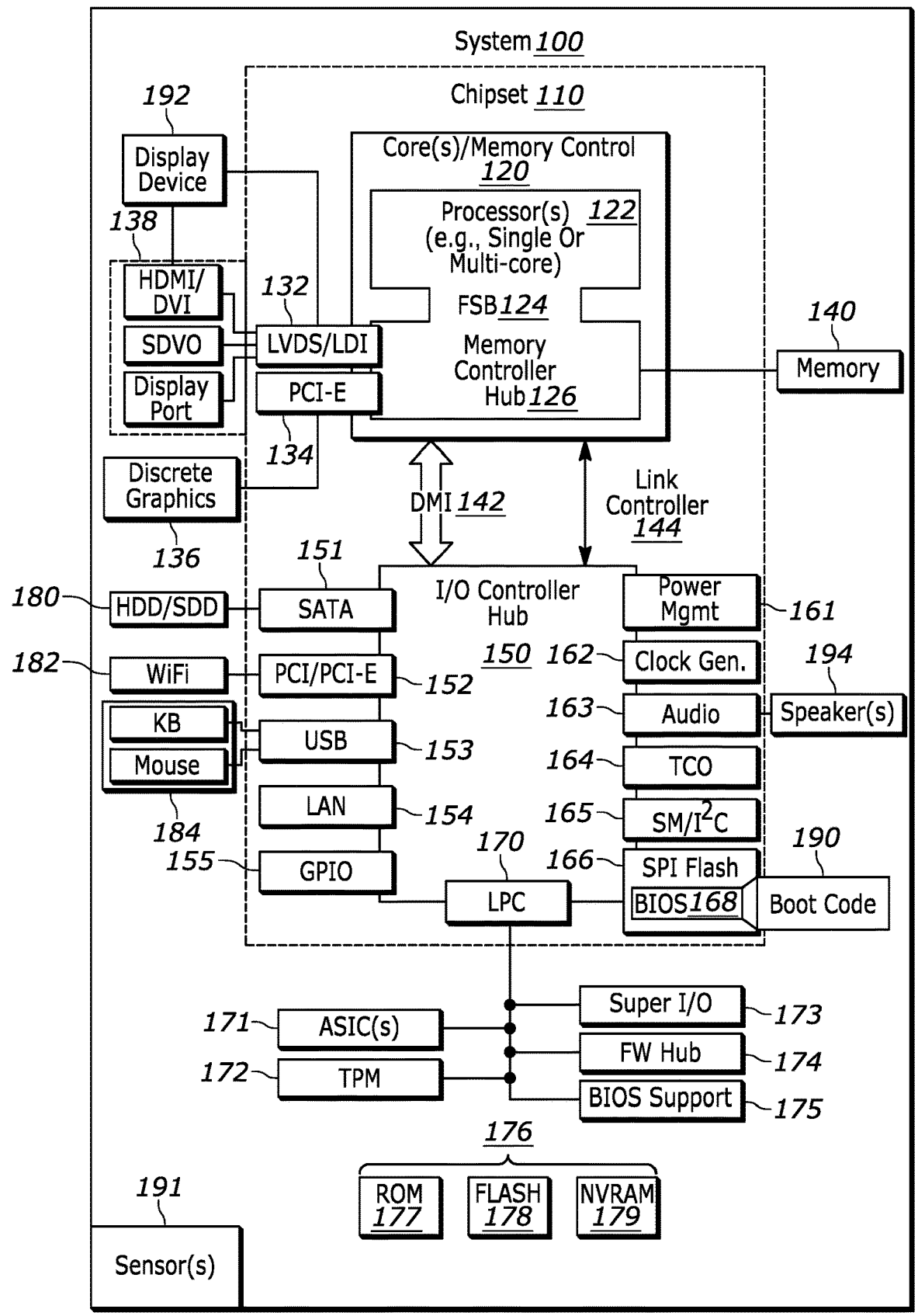
FIG. 1 is a block diagram of an example system consistent with present principles.

Among other things, the detailed description below discusses VR wire tracking. For example, a wired VR headset may be used to play graphic-intensive PC games or explore CPU/GPU-intensive visualizations, all while using a wire setup and notifications to help with user safety. Cables and/or cable systems may be used to connect the PC to the VR headset so that, when the user is engrossed in the VR content and possibly moving rapidly in a tracked area, the user may be notified of the connection cable or cable system to prevent it from becoming a tripping hazard (e.g., even in situations where the cable management system might be mounted on a ceiling since a cable can still entangle the user). This in turn can ensure a more fully-immersive VR experience for the user in that the user need not be constantly sensitive of tripping, choking, etc.

Accordingly, in one aspect a VR system may be used to track a connection cable or cable system's location relative to the user to display notifications in the VR environment itself when the cable is near the user's feet (e.g., responsive to decision logic inferring that the user has the potential to be tripped or entangled in the cable). To do so, the device may use an IR camera to track an IR reflector on a surface of the connection cable or cable systems, for example.

The IR reflector can be patterned to be machine-readable, such as using a bar code. The IR reflector might also be patterned-painted onto the outside of the connection cable, and/or can be a sleeve that wraps around the connection cable. The IR reflector can also be a strip that can be glued onto the connection cable. In various examples, the IR reflectors may also be located only on segmented portions of the connection cable (e.g., to help further disambiguate various segments of a given cable from each other).

The position of the IR reflectors on the connection cable, and hence location of the cable itself, can be determined relative to the headset's own location and orientation using an outside-in VR position system and/or an inside-out VR position system. The particular shape, position, and orientation of different segments of the cable may also be determined from the IR reflectors on the surface of the connection cable.

For example, when the connection cable position is known and when the user's extrapolated user motion indicates entanglement or future entanglement of the feet or shoulders with the cable, the device may present a representation of the connection cable in the VR environment itself so user can be aware of the entanglement danger. User motion may be extrapolated using, for example, action or gesture recognition to recognize the beginnings of various user actions/gestures (as indicated in input from a camera) as well as motion vectors for a user's next motion as part of the recognized action/gesture to determine whether an extrapolated future position of a body part of the user would result in entanglement (or even one of the other triggers below being met).

Other visual as well as sound indicators may also be presented to alert the user of an entanglement danger.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, thermal imaging cameras, infrared (IR) cameras, three-dimensional (3D) cameras, and/or cameras otherwise integrated into the system 100 and controllable by the processor 122 to gather still images and/or video consistent with present principles. Thus, for example, one or more forward-facing cameras might be on a headset being worn by a user so that the system 100 may execute computer vision for wire tracking and headset location tracking, and one or more inward-facing cameras might also be on the headset for eye tracking.

Additionally, though not shown for simplicity, in some embodiments the system 100 may include a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122.

Still further, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
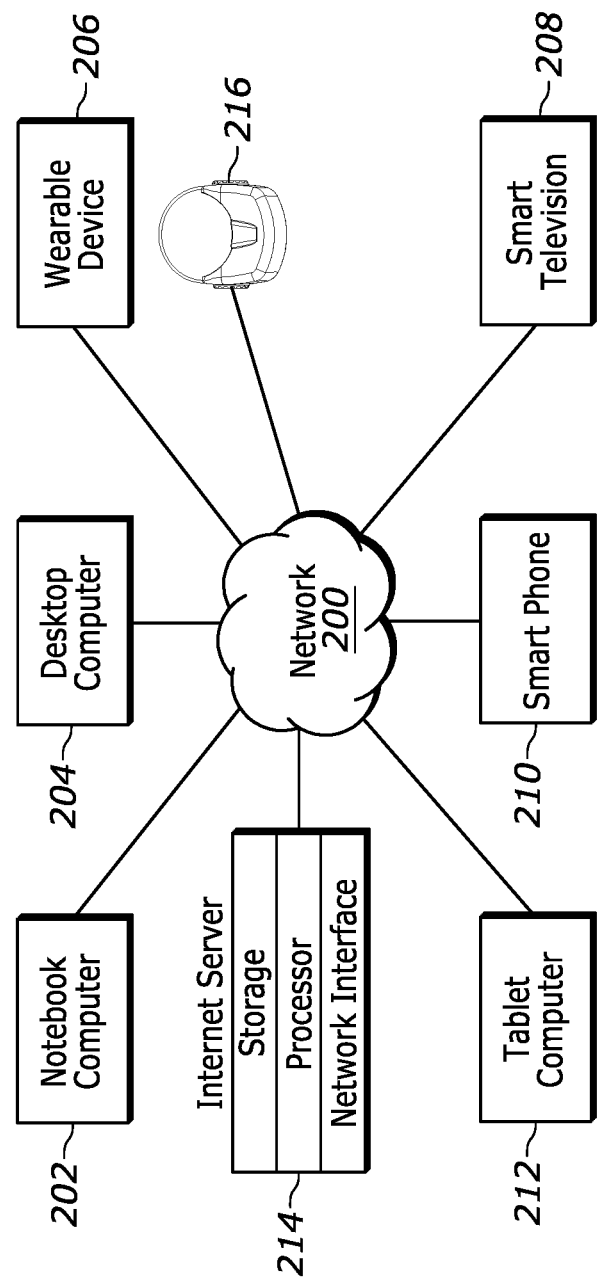
FIG. 2 is a block diagram of an example network of devices consistent with present principles.

Turning now to FIG. 2, example devices are shown communicating over a network 200 such as the Internet in accordance with present principles, such as for VR processing and presentation. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Figure 3:
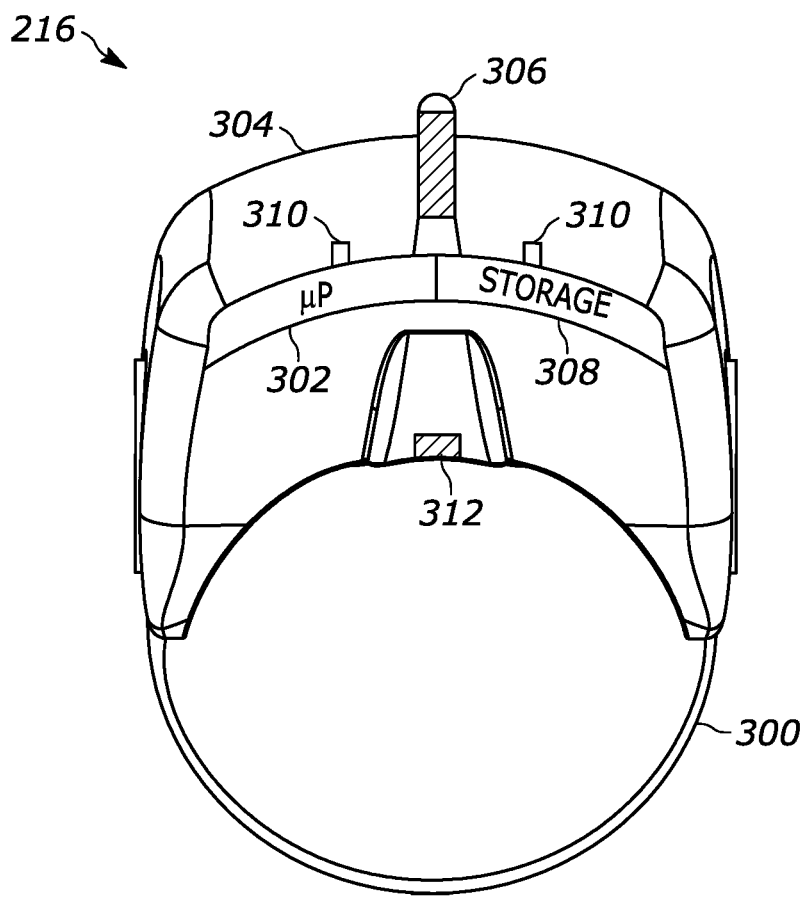
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. The camera 306 may also be used for gesture recognition to recognize gestures made by the user using their hand, arm, etc. However, further note that the camera(s) 306 may be located at other headset locations as well. Also note that in some examples, inward-facing cameras 310 may also be mounted within the headset 216 and oriented to image the user's eyes for eye tracking while the user wears the headset 216 (e.g., to determine where a user is looking in 3D space to select a real world or graphical object).

Additionally, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets that might also have wires for which location should be tracked. For example, the headset may be established by an AR headset that may have a transparent display that is able to present 3D virtual objects/content.

Now in reference to FIG. 4A, it shows an example perspective view of a user 400 standing within a room 402 while wearing a headset 404 to interact with or view a VR presentation/simulation via the headset 404 (though in other embodiments the simulation may be an AR or MR simulation). The simulation may be generated at a computer 406, sometimes in conjunction with a remotely-located server, using VR software to visually present stereoscopic images on the display of the headset 404. The computer 406 may therefore control the headset 404 to present audio and video VR content at the headset 404 through one or more wired connections. The computer 406 may be a laptop computer, a smartphone, a video game console, etc.

As for the wired connections, two different wires 408, 410 are shown connecting the headset 404 to the computer 406, though more or less wires may also be used in other embodiments. In the present example, the wire 408 may be an audio wire for transmitting 3D binaural audio to the headset 404 while the wire 410 may be a video wire for transmitting stereoscopic video content to the headset 404.

Various cameras 412 located at various positions within the room 402 may be used for outside-in location tracking of the wires 408, 410 as well as the headset 404 itself. The cameras 412 may be positioned at different angles to observe all sides of the user 400. The cameras 412 may be in wired or wireless communication with the computer 406 to provide respective real-time video streams from each camera 412 to the computer 406. Accordingly, the computer 406 may execute object recognition and computer vision using the video streams to track the locations of the wires 408, 410 in real space as the user engages in the VR simulation. In certain examples, the cameras 412 may be red green blue (RGB) cameras that may be used by the computer 406 to identify and track the locations of the wires 408, 410 using an RGB video stream from each camera 412. Additionally or alternatively, the cameras 412 may be infrared (IR) cameras that may be used by the computer 406 to identify and track the locations of the wires 408, 410 using an IR video stream from each camera 412.

Thus, in an example embodiment where the cameras 412 are IR cameras, the computer 406 may track the locations of various segments of the wires 408, 410 by tracking respective IR light reflectors on one or more respective segments of each wire 408, 410. For example, the wire 408 may have plural first patterned IR light reflectors 409 in the form of wire segments with IR light-reflective dots on the wire's exterior as shown in FIG. 4A, while the wire 410 may have plural second patterned IR light reflectors 411 in the form wire segments with IR light-reflective slanted lines on the wire's exterior as also shown in FIG. 4A. Each patterned segment of reflectors 409, 411 may partially or completely circumscribe the respective wire 408, 410 on which it is disposed. Additionally, each reflector 409, 411 may extend longitudinally along the respective wire segment while also being separated from other similar patterned IR light reflectors by other wire segments without IR light reflectors to further assist in disambiguation and hence wire location tracking. However, also note that while plural patterned reflectors 409, 411 are shown on each wire 408, 410, in some examples only one reflector 409, 411 maybe disposed on each wire 408, 410 and may extend over some or all of the length of the respective wire 408, 410 between the headset 404 and computer 406.

Also note that the IR light reflectors 409, 411 that are shown are examples and that other types and patterns of IR light reflectors may also be used, including IR light-reflective barcodes and quick response (QR) codes that have identifiable and different top, bottom, left and right sections for high-fidelity location tracking based on the identified orientations of the barcodes and/or QR codes.

Furthermore, in addition to or in lieu of the foregoing, different distinguishable IR light emitters may also be juxtaposed at various segments along the wires 408, 410 for wire location tracking as well (e.g., IR light emitting diodes (LEDs) establishing different shapes and/or patterns such as those described above).

Similarly, even if the cameras 412 are RGB cameras, similar patterns, barcodes, QR codes, and light emitters but for the visible light spectrum may also be embodied on the various segments of the wires 408, 410 for location tracking.

Still further, in terms of elements that are IR and/or RGB light-reflective for location tracking, these elements may be painted on the wires 408, 410 in certain examples. Additionally or alternatively, the elements may be established by wire sleeves that partially or fully circumscribe the wires 408, 410. The elements may also be established by layers of plastic or another suitable material that may be glued onto the wire, and/or established by stickers with glue on the back to stick to the wires 408, 410.

Before describing FIG. 4B also note that the wires 408, 410 may be established by various different types of wires, including but not limited to high-definition multimedia interface (HDMI) cables and universal serial bus (USB) cables including USB type A, B, and C cables.

Now in reference to FIG. 4B, it shows a similar setup as FIG. 4A except that, rather than using the cameras 412 for outside-in location tracking of the wires 408, 410, the computer 406 may instead receive a respective real-time video stream from one or more outward-facing cameras on the headset 404 itself to perform inside-out location tracking (e.g., still using object recognition and computer vision). For example, the camera used per FIG. 4B may be similar to the camera 306 described above, and/or may have IR light sensing and/or RGB light sensing capability for sensing IR or RGB-reflective elements on the wires 408, 410.

Thus, contrasting FIGS. 4A and 4B, similar location tracking principles may be used, but for FIG. 4A the cameras 412 may be fixed to various locations within the user's environment for location tracking of the wires 408, 410, whereas per FIG. 4B one or more cameras may be attached to the user via the headset 404 for location tracking of the wires 408, 410.

Figure 5:
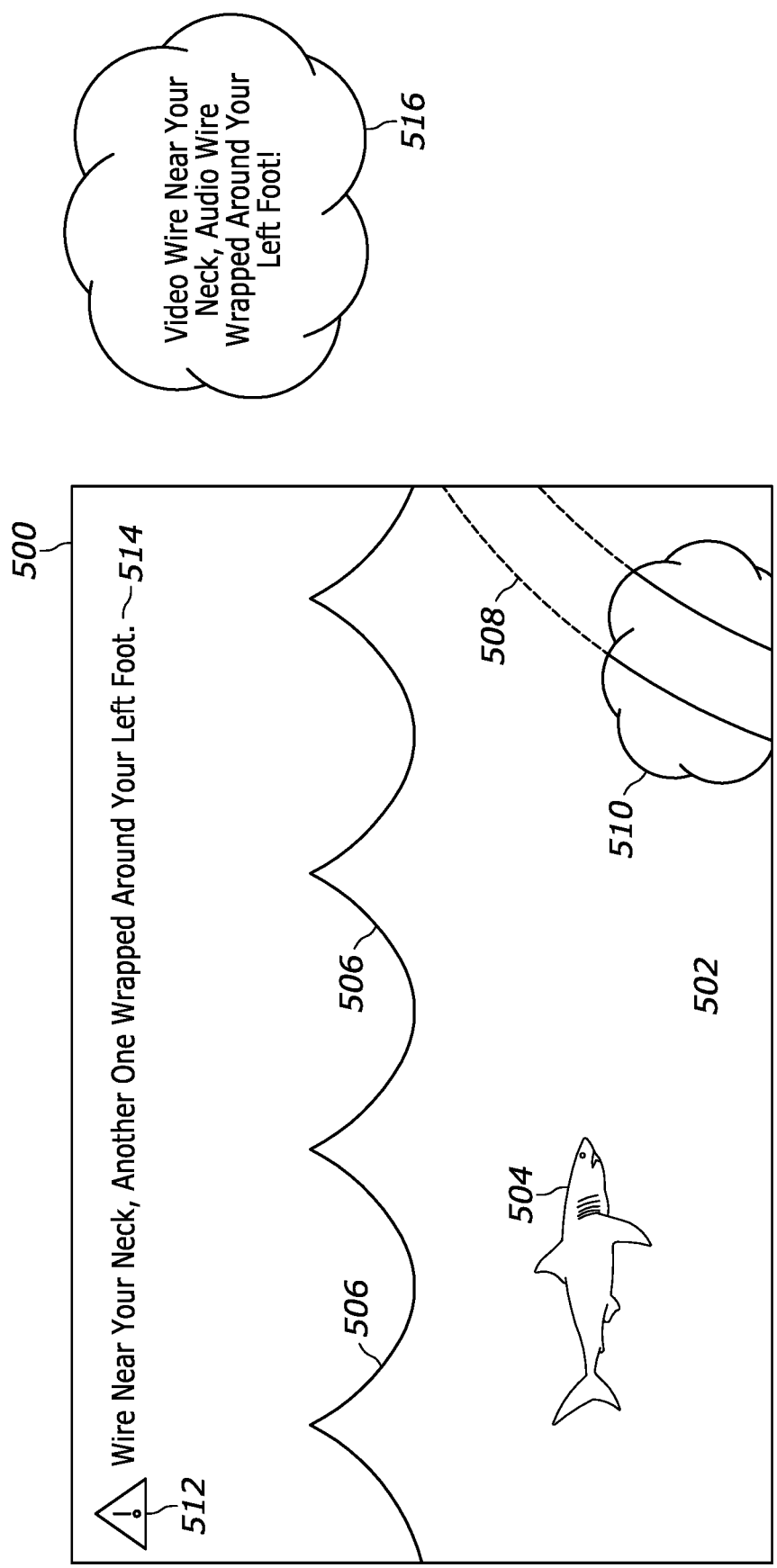
FIG. 5 shows an example graphical user interface (GUI) that may be presented on a display of the headset to present one or more visual notifications regarding the locations of various wires to a user consistent with present principles.

Now in reference to FIG. 5, an example graphical user interface (GUI) 500 is shown that may be stereoscopically presented on the display of a headset such as the headset 404 during a VR simulation presented at the headset. Therefore, VR content 502 may be presented as part of the GUI 500. In this example, the VR content 502 includes an ocean simulation where a virtual shark 504 can be seen beneath the waves 506.

During the VR simulation, the GUI 500 may dynamically update responsive to one or more triggers related to the headset's wires being satisfied. For example, one of the headset's wires might be no more than a threshold distance away from the user's neck, which in turn may be a choking hazard to the user if the wire were to wrap around the user's neck. Another portion of the same wire or even another of the headset's wires might also be wrapped around a lower extremity of the user, such as the user's foot, ankle, or leg, presenting a tripping hazard. Accordingly, in the present example the GUI 500 may dynamically update to present various different types of visual notifications concurrently with presentation of the VR content itself to notify the user of the locations of the wires for the user to take caution while interacting with the VR content.

As one example notification, a representation of an at least partial outline 508 of a wire relative to a real-world position/location of the user may be presented. Here the partial outline 508 is formed by perforated lines indicating the exterior surface of the wire. Thus, the partial outline 508 may establish a semi-transparent rendering of the wire and may be generated using alpha blending to transparently superimpose the outline 508 over the VR content itself.

Additionally or alternatively, a cloud window 510 may be presented to show a real-time, real-world RGB or IR camera feed of the actual wire according to its position relative to the user as captured by an outward-facing camera on the VR headset that has a field of view similar to that of the user themselves. Or the cloud window 510 may show a computer-generated representation of the wire in full RGB color images so that the wire still appears to be disposed at a certain location with respect to the user even if the cameras used to track the wire are located elsewhere in the user's environment for outside-in location tracking.

As another example, a non-text, graphical caution icon 512 may be presented on the GUI 500 along with text 514. The text 514 may be tailored to the particular wire triggers/locations that are identified using computer vision to provide another way to notify the user with particularity of the locations of whatever wire(s) satisfy the triggers. Accordingly, in this example and based on the execution of computer vision to track the locations of the wires, the text 514 indicates that a first wire is near the user's neck (within the threshold distance described above) and that another wire is wrapped at least partially around the user's left foot (the left foot also being identified using objection recognition and/or computer vision).

Still further, note that in addition to or on lieu of using visual notifications, the headset may also present one or more audible or haptic notifications responsive to one or more of the triggers being satisfied. An example audible notification is thus shown via the speech bubble 516. The audible notification may be presented using a digital assistant to indicate, in a computerized voice, that the headset's video wire is located near the user's neck and that the headset's audio wire is wrapped around the user's left foot. In some examples, these two respective segments of the audible notification may be generated using 3D binaural audio so that the words "video wire near your neck" are perceived by the user to be coming from a location in real-world 3D space at which the relevant portion of the video wire near the user's neck is disposed, and so that the words "audio wire wrapped around your left foot" are perceived by the user to be coming from a location in real-world 3D space at which the relevant portion of the audio wire wrapped around the user's food is disposed.

As far as haptic notifications go, one or more vibrators within the headset may be used. In some examples, respective vibrators may be located on the front, back, left side, right side, top, and bottom of the headset so that vibrations can be presented in the direction of the relevant portion of the relevant wire itself for which the headset is notifying the user.

Figure 6:
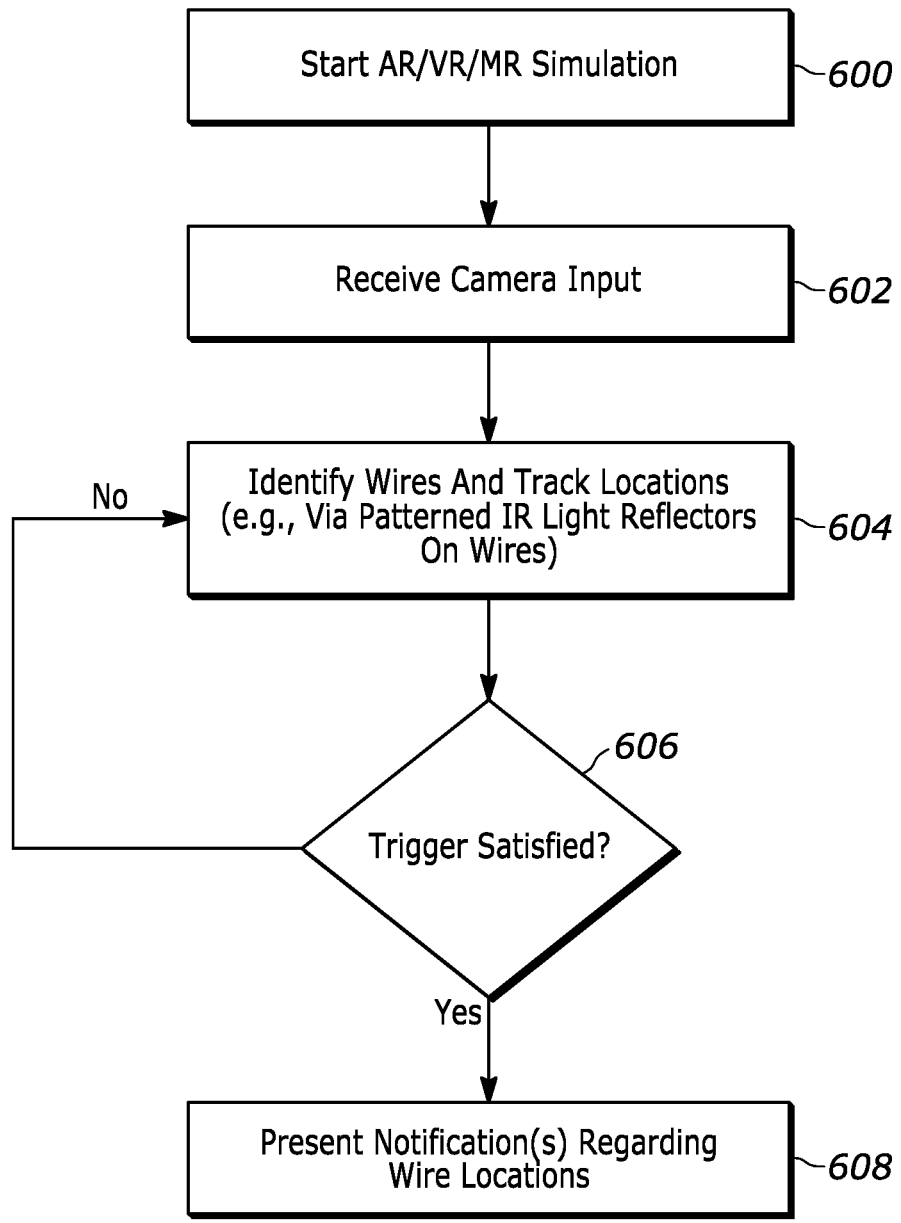
FIG. 6 illustrates example logic in example flow chart format that may be executed by a device consistent with present principles.

Continuing the detailed description in reference to FIG. 6, it shows example logic consistent with present principles that may be executed by a client device (such as the computer 406 and/or headset 404) and/or a remotely-located server in any appropriate combination. Note that while the logic of FIG. 6 is shown in flow chart format, other suitable logic may also be used.

Beginning at block 600, the device may begin presenting a VR simulation, with it being further noted that if desired present principles may be used for AR and MR simulations as well. From block 600 the logic may proceed to block 602.

At block 602 the device may receive input from one or more cameras, such as the cameras 306, 412 described above. The logic may then proceed to block 604 where the device may execute computer vision to identify and track the locations of various wires connected to the user's headset. Again note as an example that the device may track the locations of various segments of various wires via respective patterned IR light reflectors located longitudinally along various segments of the wires.

From block 604 the logic may proceed to decision diamond 606. At diamond 606 the device may determine whether a trigger has been satisfied for presenting one or more electronic notifications regarding the location of the wire(s) relative to the user as described herein. For example, using computer vision and the input from the camera, the device may determine whether a wire is contacting/physically touching a body part of the user other than the user's head. The device may similarly determine whether a wire is wrapped at least partially around a portion of the user, such as around half the circumference of a given segment of the user's leg (half used as an example threshold to avoid false positives), or even wound fully around at least once. As yet another example, the device may determine whether a wire is less than a threshold distance away from a lower extremity of the user or even the user's neck, torso, arms, and/or hands.

As but one more example, the device may determine whether a given wire is fully extended between the headset and an opposite anchor point (e.g., the controlling computer, or a location at which the opposite end of the wire might be physically anchored to a ceiling or other surface to keep the wire farther away from the user). Fully extended may include there being no slack in the wire so that the wire is taut.

Responsive to a negative determination at diamond 606, the logic may revert back to block 604 and proceed again therefrom to monitor for whether one or more of the triggers might be satisfied in the future. However, responsive to an affirmative determination at diamond 606, the logic may instead proceed to block 608.

At block 608 the device may present one or more electronic notifications regarding wire locations as discussed herein. For example, at block 608 the notifications 508, 510, 512, 514, and 516 may be presented. As another example, if a wire is determined to be taut between the headset and an anchor point as described above, the visual or audible warning may indicate "Stop, do not go any farther in the same direction, scoot back a little the way you came" as preconfigured as a warning to be presented specifically for a taut wire situation.

Figure 7:
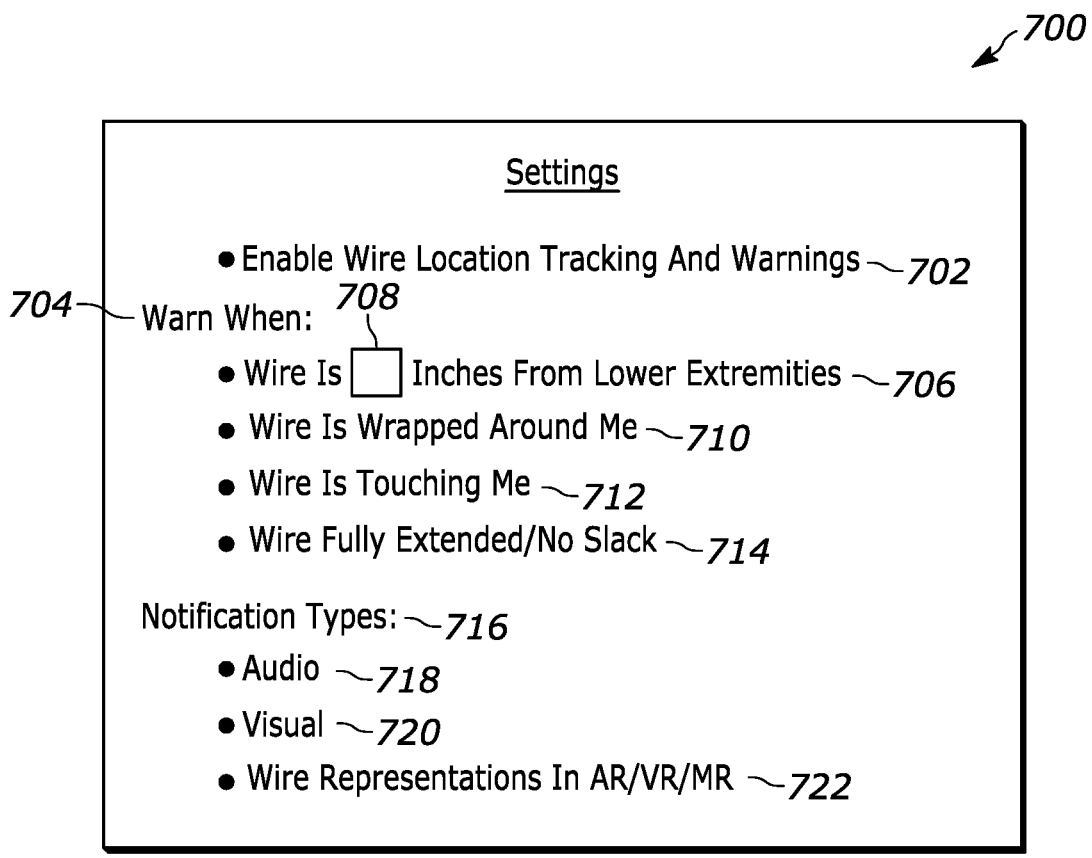
FIG. 7 shows an example settings GUI that may be presented on a display to configure one or more settings of a device to operate consistent with present principles.

Now in reference to FIG. 7, an example GUI 700 is shown that may be presented on the display of the device undertaking the logic of FIG. 6 to configure/enable one or more settings of the device for VR operation and wire tracking consistent with present principles. The settings GUI 700 may be reached by navigating a settings menu of the device itself or a dedicated VR app menu, for instance. Also note that in the example shown, each option discussed below may be selected by directing touch or cursor or other input to the respective check box adjacent to the respective option.

As shown in FIG. 7, the GUI 700 may include an option 702 that may be selectable a single time to set or enable the device/system to undertake present principles in multiple future instances. For example, the option 702 may be selected to set or configure the device to execute the logic of FIG. 6 for multiple different VR simulations presented at different times and/or to execute other functions described above in reference to FIGS. 4A, 4B, and 5.

The GUI 700 may also include a setting 704 at which the end-user may select one or more particular triggers for the device to use consistent with present principles. Thus, a first option 706 is shown that may be selectable to use a threshold distance from lower extremities as a trigger, and the user may even specify a particular distance to use as the threshold by providing numerical input to input box 706. Other example triggers that may be selected include a wire being wrapped around the user (option 710), a wire physically touching part of the user (option 712), and a wire being fully extended so that it is taut without slack (option 714).

As also shown in FIG. 7, the GUI 700 may include a setting 716 at which various types of notifications to provide responsive to triggers being met may be selected. Accordingly, option 718 may be selected to select audio notifications, option 720 may be selected to select visual notifications like the notifications 512 and 514, and option 722 may be selected to select visual wire representations like the notifications 508, 510 described above. Though not shown, another option may also be presented to select haptic notifications as described above.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   track a location of at least a segment of a wire of a virtual reality (VR) headset;
   based on the location and responsive to a trigger, present notification regarding the location on a display of the VR headset, the trigger comprising extrapolated future user motion indicating future entanglement of the segment with a user, the notification presented as a cloud-shaped window showing a feed of the wire according to the wire's position relative to the VR headset.

2. The device of claim 1, wherein the feed is a real-time camera feed of the wire according to the wire's position relative to the VR headset.

3. The device of claim 2, wherein the real-time camera feed is a red green blue (RGB) camera feed.

4. The device of claim 2, wherein the real-time camera feed is an infrared (IR) camera feed.

5. The device of claim 1, wherein the feed shows a computer-generated representation of the wire in full red green blue (RGB) color images, the computer-generated representation being different from an actual camera feed from a real-world camera.

6. The device of claim 1, wherein the instructions are executable to:
   present a settings graphical user interface (GUI), the settings GUI comprising plural options that are each selectable to select a different type of trigger for the device to use in the future to present warning notifications of potential wire entanglement.

7. The device of claim 6, wherein the plural options comprise a first option that is selectable to select a first trigger for the device to use, the first trigger being related to the wire being within a threshold distance of one or more lower extremities.

8. The device of claim 6, wherein the plural options comprise a first option that is selectable to select a first trigger for the device to use, the first trigger being related to the wire being wrapped around part of the user.

9. The device of claim 6, wherein the plural options comprise a first option that is selectable to select a first trigger for the device to use, the first trigger being related to the wire touching but not being wrapped part of the user.

10. The device of claim 6, wherein the plural options comprise a first option that is selectable to select a first trigger for the device to use, the first trigger being related to the wire being taut.

11. The device of claim 6, wherein the plural options comprise:
   a first option that is selectable to select a first trigger for the device to use, the first trigger being related to the wire being within a threshold distance of one or more lower extremities;
   a second option that is selectable to select a second trigger for the device to use, the second trigger being related to the wire being wrapped around part of the user;
   a third option that is selectable to select a third trigger for the device to use, the third trigger being related to the wire touching but not being wrapped part of the user; and
   a fourth option that is selectable to select a fourth trigger for the device to use, the first trigger being related to the wire being taut;
   wherein the first, second, third, and fourth options are different from each other.

12. A method, comprising:
    tracking a location of at least a segment of a wire of a headset;
    based on the location and based on extrapolated future user motion indicating future entanglement of the segment with a user, presenting a notification regarding the location on a display of the headset, the notification presented as a cloud-shaped window showing a feed of the wire according to the wire's current position relative to the headset.

13. The method of claim 12, wherein the feed is a real-time camera feed of the wire according to the wire's position relative to the headset.

14. The method of claim 12, wherein the feed shows a computer-generated representation of the wire in full red green blue (RGB) color images, the computer-generated representation being different from an actual camera feed from a real-world camera.

15. The method of claim 12, comprising:
    presenting a settings graphical user interface (GUI), the settings GUI comprising plural options that are each selectable to select a different type of trigger to use in the future for the headset to present warning notifications of potential wire entanglement.

16. At least one computer readable storage medium (CRSM) that is not a transitory signal, the at least one CRSM comprising instructions executable by at least one processor to:
    track a location of at least a segment of a wire of a headset;
    based on the location and based on extrapolated future user motion indicating future entanglement of the segment with a user, present an electronic notification regarding the location, the electronic notification presented as a cloud-shaped window showing a feed of the wire according to the wire's current position relative to the headset.

17. The CRSM of claim 16, wherein the feed is a real-time camera feed of the wire according to the wire's position relative to the headset.

18. The CRSM of claim 16, wherein the feed shows a computer-generated representation of the wire in full red green blue (RGB) color images, the computer-generated representation being different from an actual camera feed from a real-world camera.

19. The CRSM of claim 16, wherein the instructions are executable to:
    present a settings graphical user interface (GUI), the settings GUI comprising plural options that are each selectable to select a different type of trigger to use in the future for the headset to present warning notifications of potential wire entanglement.

20. The CRSM of claim 19, wherein the plural options comprise:
- a first option that is selectable to select a first trigger for the device to use, the first trigger being related to the wire being within a threshold distance of the user;
- a second option that is selectable to select a second trigger for the device to use, the second trigger being related to the wire being wrapped around part of the user; and
- a third option that is selectable to select a third trigger for the device to use, the third trigger being related to the wire touching but not being wrapped part of the user;
- wherein the first, second, and third options are different from each other.

* * * * *